United States Patent
Merryman et al.

(10) Patent No.: US 8,635,827 B2
(45) Date of Patent: Jan. 28, 2014

(54) RECREATIONAL VEHICLE ROOFING SYSTEM

(71) Applicant: Alpha Systems, Inc., Elkhart, IN (US)

(72) Inventors: Joseph W. Merryman, Nappanee, IN (US); Michael J. Hubbard, Anderson, IN (US)

(73) Assignee: Alpha Systems, Inc., Elkhart, IN (US)

( * ) Notice: Subject to any disclaimer, the term of this patent is extended or adjusted under 35 U.S.C. 154(b) by 0 days.

(21) Appl. No.: 13/690,173

(22) Filed: Nov. 30, 2012

(65) Prior Publication Data
US 2013/0086866 A1 Apr. 11, 2013

Related U.S. Application Data

(63) Continuation of application No. 12/042,693, filed on Mar. 5, 2008, now Pat. No. 8,327,594.

(60) Provisional application No. 60/904,930, filed on Mar. 5, 2007.

(51) Int. Cl.
*E04B 5/00* (2006.01)

(52) U.S. Cl.
USPC .............................................. 52/408; 52/413

(58) Field of Classification Search
USPC .................................. 52/408, 413, 219, 588.1
See application file for complete search history.

(56) References Cited

U.S. PATENT DOCUMENTS

| | | | |
|---|---|---|---|
| 2,619,477 | A | 11/1952 | Banes et al. |
| 4,978,703 | A | 12/1990 | Ainsworth et al. |
| 5,229,197 | A | 7/1993 | Peterson |
| 5,387,648 | A | 2/1995 | Ainsworth |
| 6,084,031 | A | 7/2000 | Medsker et al. |
| 6,864,195 | B2 | 3/2005 | Peng |
| 7,008,699 | B2 | 3/2006 | Jourdian et al. |
| 7,101,628 | B2 | 9/2006 | Peng |
| 7,954,286 | B2 | 6/2011 | Khan et al. |
| 2004/0033741 | A1 | 2/2004 | Peng |
| 2005/0182193 | A1 | 8/2005 | Ajbani et al. |
| 2006/0084762 | A1 | 4/2006 | Shaw |
| 2006/0179749 | A1 | 8/2006 | Brandt et al. |
| 2006/0261508 | A1 | 11/2006 | Lustiger et al. |
| 2007/0021561 | A1 | 1/2007 | Tse et al. |

OTHER PUBLICATIONS

Statement of inventor Joseph W. Merryman, dated Mar. 14, 2011.

*Primary Examiner* — Basil Katcheves
(74) *Attorney, Agent, or Firm* — Gardner, Linn, Burkhart & Flory, LLP

(57) ABSTRACT

A method of roofing an occupancy structure comprising providing a roofing membrane that comprises at least one thermoplastic membrane layer, bonding the roofing membrane to the roof of an occupancy structure, where the occupancy structure includes a roof member that is at least partially constructed of a plastic material and extends above the roofing membrane when the roofing membrane is applied to the occupancy structure. A substantially solid hot melt thermoplastic sealant is heated to enable the substantially solid hot melt thermoplastic sealant to flow and a layer of the substantially solid hot melt thermoplastic sealant is applied to an exterior surface of the thermoplastic membrane layer and a plastic portion of the roof member to seal the joint between the roofing membrane and the roof member.

20 Claims, 8 Drawing Sheets

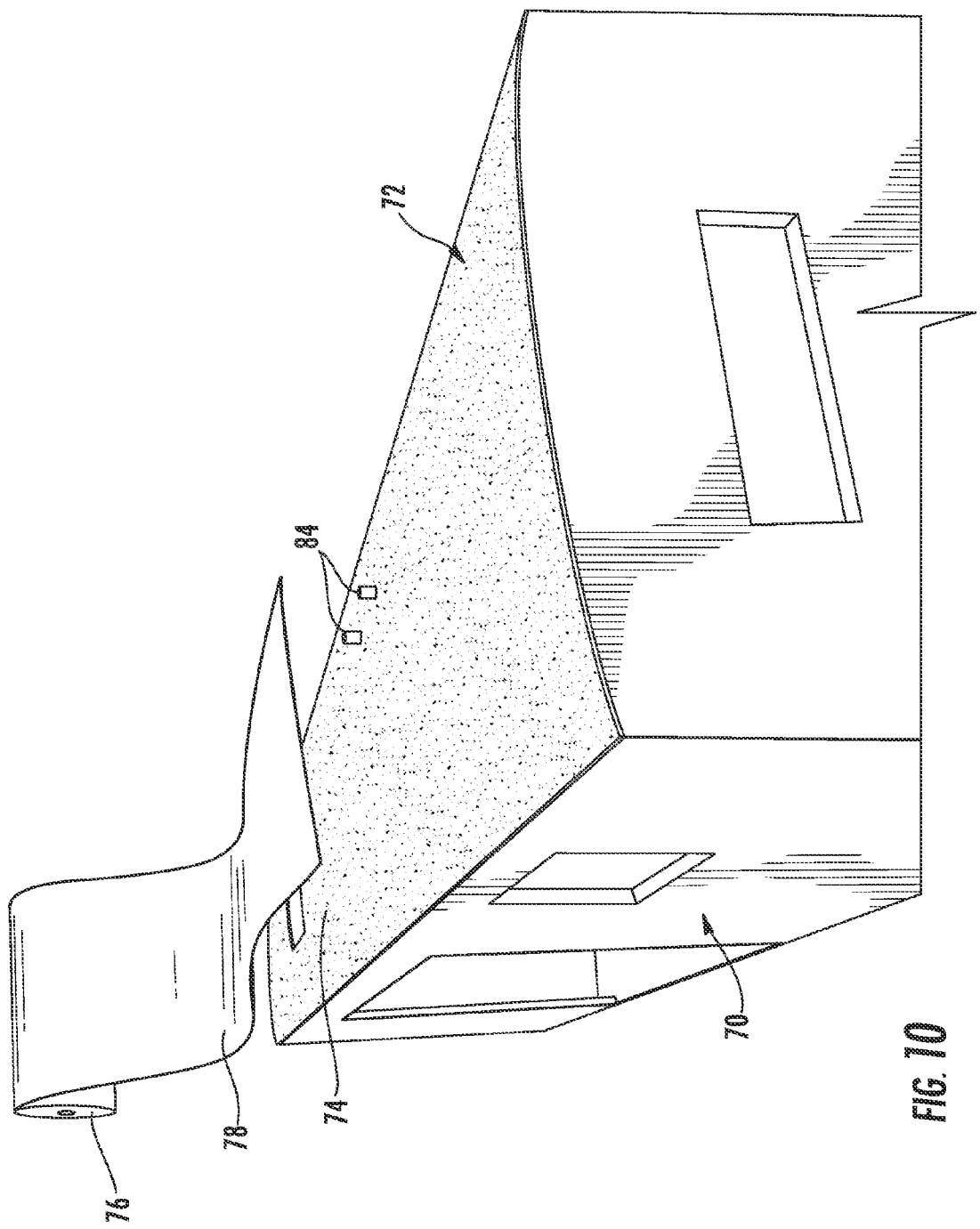

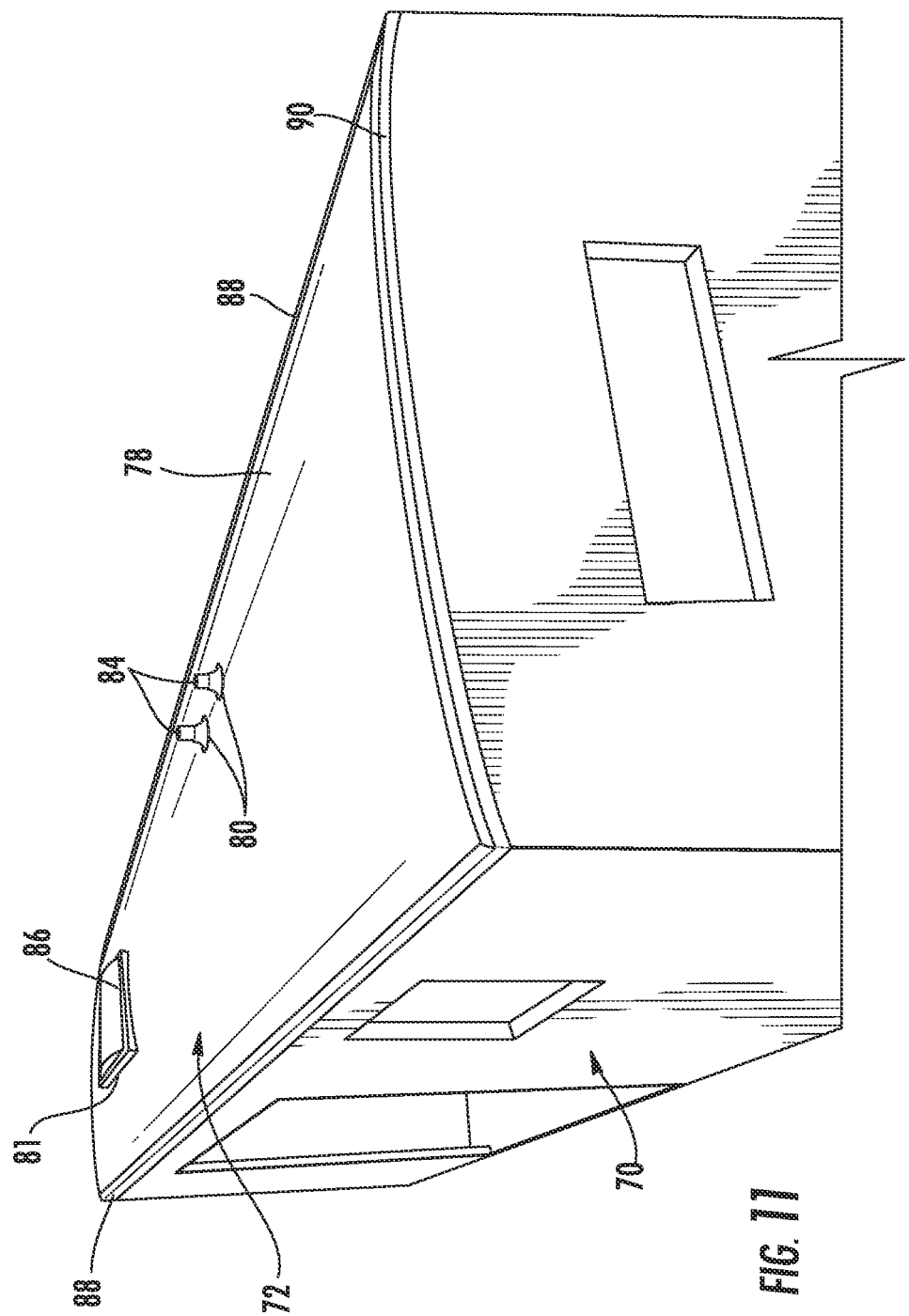

RECREATIONAL VEHICLE ROOFING SYSTEM

CROSS REFERENCE TO RELATED APPLICATION

The present application is a continuation of U.S. application Ser. No. 12/042,693, filed Mar. 5, 2008, which claims priority of U.S. provisional application Ser. No. 60/904,930 filed Mar. 5, 2007, by Merryman et al. for RECREATIONAL VEHICLE ROOFING SYSTEM, which are both hereby incorporated herein by reference in their entireties.

FIELD AND BACKGROUND OF THE INVENTION

The present invention is directed to a roofing system for a mobile occupancy structure. In particular, the present invention is directed to a roofing membrane and a sealant for roofing a mobile occupancy structure.

Various types of mobile occupancy structures are provided with roofing membranes applied as part of the roof construction of the occupancy structure to form a protective layer against harmful weather. The roofing membranes form a barrier to moisture, such as rain and snow, as well as provide protection from damaging sun rays. Mobile occupancy structures to which such roofing membranes are applied include recreational vehicles, such as trailers and motor homes, mobile homes, and trailers for use as temporary offices and classrooms, or the like.

The mobile occupancy structures typically include various roof members or roof penetrations extending upwards from the roof or mounted to the mobile occupancy structure. Roof members may include, for example, vents, air conditioning units, skylights, antennas, and ladders, as well as flash caps mounted to the upper edges of the occupancy structure adjacent the roof. In the case of upward projecting roof members, the roofing membranes must include apertures or openings to enable the roof members to pass through the roofing membrane. To prevent moisture from leaking past the roofing membrane at the apertures or joints the roof must be sealed, such as by a sealant applied proximate the apertures or joints of the roof member and the roofing membrane. Current roofing membranes for mobile occupancy structures include the rubber compound ethylene propylene diene terpolymer (EPDM), as well as thermoplastic polyolefin (TPO), with current sealants used with these roofing membranes including solvent based sealants.

SUMMARY OF THE INVENTION

The present invention provides a roofing system for a mobile occupancy structure, including a roofing membrane formed from or including thermoplastic vulcanizate (TPV) material. The roofing system may also employ, or alternatively employ, a substantially solid sealant or a high solid sealant having a high percentage of solids that may be compatibly formulated for sealing about the roof members while inhibiting shrinkage and cracking associated with sealant curing. In particular embodiments, the roofing membrane and/or substantially solid sealant are compatibly formulated with polymer bonding additives for promoting adhesion between the roofing membrane and sealant, thus improving the bond between the roofing membrane and sealant.

According to an embodiment of the invention a mobile occupancy roofing system comprises a roofing membrane affixed to the roof substrate of a mobile occupancy structure, with the roofing membrane including at least one thermoplastic vulcanizate (TPV) membrane layer. The mobile occupancy structure includes a roof member joined thereto with a sealant disposed on and adhering to the roofing membrane and roof member. The TPV membrane layer may include a TPV polymer bonding additive and the sealant may include a sealant polymer bonding additive, with the TPV polymer bonding additive and sealant polymer bonding additive interacting to promote adhesion of the sealant with the TPV membrane layer. The sealant may be a substantially solid sealant comprising at least approximately 90% solids by weight, and may even be 100% solids by weight, prior to being applied to the mobile occupancy structure. The substantially solid sealant may comprise a hot melt sealant.

The TPV polymer bonding additive and sealant polymer bonding additive may promote adhesion by mechanical or chemical interaction. Mechanical interaction may be a result of polar groups in the TPV polymer bonding additive and sealant polymer bonding additive, or may result from the TPV polymer bonding additive heat welding with the sealant polymer bonding additive during application of the sealant.

The TPV polymer bonding additive may comprise an ethylene vinyl acetate (EVA) and the sealant polymer bonding additive may comprise an EVA. The TPV polymer bonding additive may alternatively comprise a thermoplastic polyolefin (TPO) with the sealant polymer bonding additive comprising a TPO. Alternatively, one of the TPV polymer bonding additive and the sealant polymer bonding additive may comprise a maleic anhydride grafted polymer (MAH), with the other of the TPV polymer bonding additive and sealant polymer bonding additive comprising a gylcidyl methacrylate (GMA). The TPV polymer bonding additive may alternatively comprise a styrene ethylene butylene styrene (SEBS) and the sealant polymer bonding additive comprises a SEBS. The TPV polymer bonding additive may alternatively comprise one selected from the group of an ethylene-n-butyl acrylate, an ethylene-methyl acrylate, and an ethylene 2-ethyl hexyl acrylate, with the sealant polymer bonding additive comprising an ethylene vinyl acetate (EVA).

According to another aspect of the present invention, a mobile occupancy roofing system comprises a roofing membrane affixed to the roof substrate of a mobile occupancy structure, with a roof member joined to the mobile occupancy structure and a substantially solid sealant disposed on and adhering to the roofing membrane and roof member. The substantially solid sealant may comprise at least approximately 90% solids by weight, or even 100% solids by weight, prior to being applied to the mobile occupancy structure. The substantially solid sealant may comprise a hot melt sealant. The substantially solid sealant may include a sealant polymer bonding additive that interacts with the roofing membrane to promote adhesion. The roofing membrane may include at least one thermoplastic vulcanizate (TPV) membrane layer that includes a TPV polymer bonding additive, with the TPV polymer bonding additive and sealant polymer bonding additive interacting to promote adhesion of the substantially solid sealant with the TPV membrane layer.

According to another aspect of the present invention, a method of roofing a mobile occupancy structure comprises the steps of providing a mobile occupancy structure having a roof substrate, providing a roofing membrane including at least one thermoplastic vulcanizate (TPV) membrane layer with a TPV polymer bonding additive, and bonding the roofing membrane to the roof substrate and mounting a roof member to the mobile occupancy structure. The method further comprises providing a substantially solid sealant having at least approximately 90% solids by weight and including a sealant polymer bonding additive, and applying the substantially solid sealant to the roof member and roofing membrane with the substantially solid sealant adhering to the TPV membrane layer and the TPV polymer bonding additive interacting with the sealant polymer bonding additive. The substantially solid sealant may comprise a hot melt sealant, and may comprise 100% solids by weight prior to being applied to the mobile occupancy structure.

According to still another aspect of the present invention, a mobile occupancy structure having a roofing system comprises a mobile occupancy structure having a roof substrate, a roofing membrane affixed to the roof substrate, and a roof member affixed to the mobile occupancy structure. A hot melt substantially solid sealant is disposed about the roof member with the heat of the heated substantially solid sealant promoting bonding between the substantially solid sealant and roofing membrane. The roofing membrane may include a TPV roofing membrane layer.

In yet a further aspect of the present invention, a method of roofing a mobile occupancy structure comprises providing a roofing membrane for a mobile occupancy structure having a roof member projecting from a roof of the occupancy structure and applying the roofing membrane to the mobile occupancy structure such that the roof member projects through the roofing membrane. The method further comprises heating a hot melt sealant and applying the hot melt sealant about the roof member after heating the hot melt sealant such that the hot melt sealant bonds with the roofing membrane. The roofing membrane may include at least one TPV membrane layer with the hot melt sealant bonding to the TPV membrane layer. The TPV membrane layer may include a membrane polymer bonding additive and the hot melt sealant may include a sealant polymer bonding additive.

The TPV roofing membrane incorporates both elastic and plastic type properties to provide the roofing membrane with the flexibility of rubber and the processing of plastic. As such, the TPV roofing membrane is readily formed and applied to occupancy structures having roofs with multiple curves or radiuses and is well adapted to provide good weathering characteristics. In addition, the TPV roofing membrane provides desirable strength and stretch characteristics such that it may be installed to an occupancy structure without the inclusion of a reinforcement layer and is heat weldable. In addition, the sealant or sealant system of the present invention, which may be used with a TPV roofing membrane or another roofing membrane, such as an EPDM or TPO roofing membrane, enables use of a substantially solid sealant formed of at least approximately 90% or more solids. The substantially solid sealant and roofing membrane may be compatibly formulated by the inclusion of a polymer bonding additive to avoid the need for application of a primer to the roofing membrane while inhibiting shrinkage of the sealant during curing and the associated problems of cracking and poor adhesion while promoting sufficient bonding of the sealant to the disparate materials of the roofing membrane and roof members.

These and other objects, advantages, purposes and features of this invention will become apparent upon review of the following specification in conjunction with the drawings.

BRIEF DESCRIPTION OF THE DRAWINGS

FIG. 10 is a perspective view of the application of a roofing membrane to the occupancy structure of FIG. 7; and FIG. 11 is a perspective view of the occupancy structure to which the roofing membrane has been applied.

DESCRIPTION OF THE PREFERRED EMBODIMENTS

The present invention will now be described with reference to the accompanying figures, wherein the numbered elements in the following written description correspond to like-numbered elements in the figures.

Figure 1:
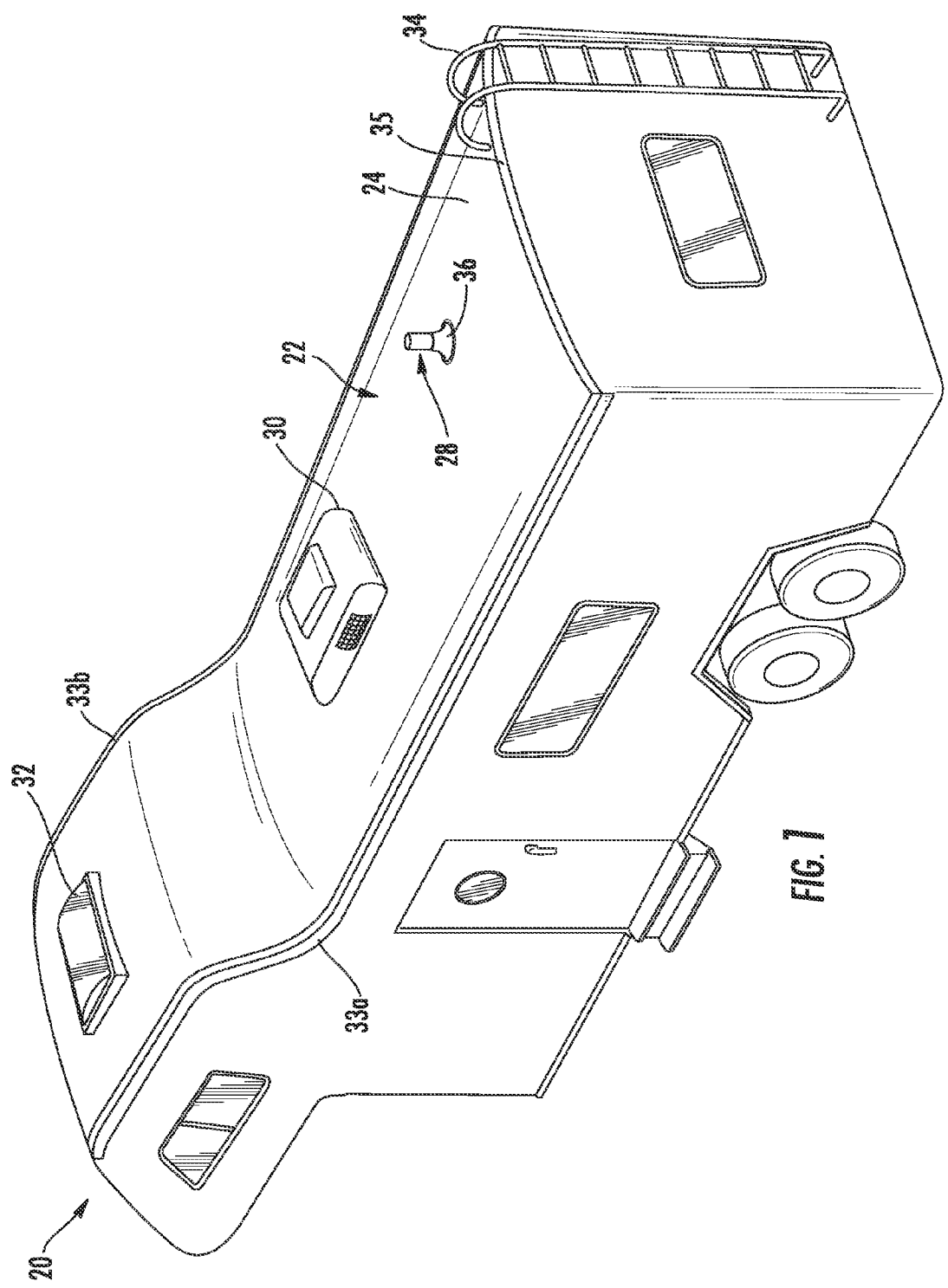
FIG. 1 is a perspective view of an occupancy structure in the form of a recreational vehicle trailer having a roof system in accordance with the present invention.
Figure 2:
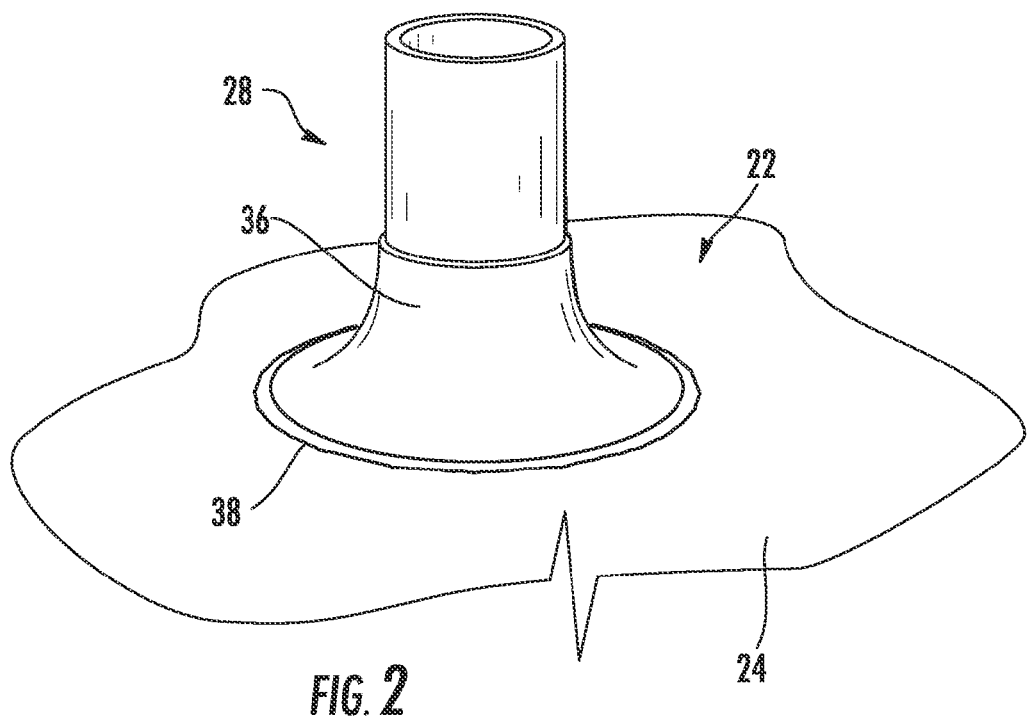
FIG. 2 is an enlarged perspective view of a roof member vent of the trailer of FIG. 1.

FIG. 1 discloses a movable occupancy structure configured as a trailer 20 incorporating a roofing system or sealing system in accordance with the present invention. Trailer 20 includes a roof 22 covered with a roofing membrane 24, which in the illustrated embodiment is constructed of a thermoplastic vulcanizate (TPV) material. Various roof members extend from roof 22 through apertures in TPV roofing membrane 24, including a vent 28, an air conditioning unit 30, a skylight 32, and a ladder 34. Other roof members include flashing caps, such as side flashing caps 33 and end flashing caps 35 (front flashing cap not shown). The flashing caps 33, 35 extend onto the roof 22 and at least partially down the sides of trailer 20. The roofing system of trailer 20 also includes a sealant disposed about the roof members, such as sealant 38 disposed about vent 28 (FIG. 2). Sealant 38 bonds to the TPV roofing membrane 24 and roof members to inhibit moisture from leaking past the roofing membrane 24 at the apertures through which the roof members extend or at the joint of flashing cap 33, 35 roof members with TPV roofing membrane 24. In the illustrated embodiment sealant 38 is a substantially solid sealant. In particular embodiments of the roofing system, TPV roofing membrane 24 and/or sealant 38 are formulated to include polymer sealant bonding additives promoting bonding between the roofing membrane 24 and sealant 38, and/or promoting bonding with the roofing members.

TPV roofing membrane 24 may be readily formed and applied to a movable occupancy structure having a roof with multiple curves or radiuses, such as roof 22, and is well adapted to provide good weathering characteristics. Further, as described below, TPV roofing membrane 24 has sufficient tensile set properties of strength and stretch characteristics such that it may be installed to trailer 20 without the inclusion of a reinforcement layer. Still further, TPV roofing membrane 24 has thermoplastic characteristics such that it is heat weldable and may be readily reworked if required and/or may be processed with heat sealing operations. In addition, scrap trimmings of TPV roofing membrane 24 may be re-used or recycled in the production of TPV roofing membrane 24. Thus, TPV roofing membrane 24 has both elastic and plastic properties giving it the feel of rubber and the processing of plastic.

As best seen in FIG. 2, sealant 38 is disposed about conventional flange 36 of vent 28 extending from roof 22 through roofing membrane 24, such that sealant 38 adheres to both flange 36 and roofing membrane 24. Although not shown, sealant 38 is likewise disposed about the other roof members, including air conditioning unit 30, skylight 32, ladder 34, and at the joints formed with flashing caps 33, 35, and may be disposed about or adjacent other roof members that are not shown, such as antennas, many of which roof members may also include flanges that are likewise not shown. Sealant 38, thus, adheres to such roof members and roofing membrane to provide a moisture barrier.

In the illustrated embodiment, as also described in more detail below, sealant 38 is a substantially solid sealant or high solid sealant formed of at least approximately 90-100% solids to inhibit shrinkage of the sealant 38 during curing and the associated problems of shrinkage and adhesion, such as may occur with solvent based sealants. Still further, as also discussed below, due to the selected formulation of sealant 38 and TPV roofing membrane 24 to be compatible, sealant 38 may sufficiently bond to TPV roofing membrane 24 without the need to prime TPV roofing membrane 24 prior to application of sealant, thereby promoting sufficient bonding of the sealant to both the disparate materials of the roofing membrane 24 and roof members.

Figure 3:
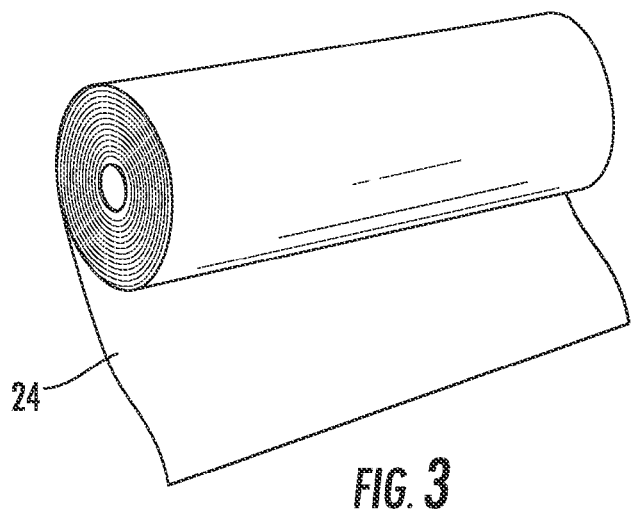
FIG. 3 is a perspective view of a roll of TPV roofing membrane in accordance with the present invention.
Figure 3A:
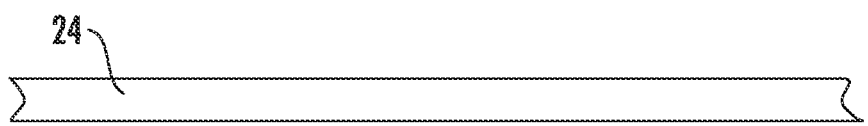
FIG. 3A is a partial side elevation view of the TPV roofing membrane of FIG. 3.

Referring to FIG. 3, a roll 40 of TPV roofing membrane 24 may be used during construction of a movable occupancy structure. Roll 40 may be approximately 114 inches wide by 450 feet long and, as described in more detail below, is unrolled and adhered to the roof of a movable occupancy structure during construction thereof. It should be understood that alternative rolls of roofing membrane may be utilized, such as for example with alternatively sized occupancy structures.

The TPV compound for producing TPV roofing membrane 24 can be produced in thermoplastic equipment and does not require a post cure process as does rubber. The TPV compound may, for example, be produced in a banbury mixer, a twin screw extruder, or other medium to high intensity mixers. In the case of a twin screw extruder, the base ingredients for forming the TPV membrane are added in the feed throat with the exception of a portion of the oil and the curative. Intense mixing then occurs during the beginning of the process. Subsequently, the curative is added at a point where the mixture temperature has been increased to approximately 425 degrees Fahrenheit. The TPV material may be formed directly into rolls at a sheeting process, or may alternatively be pelletized and subsequently formed into sheeting at a separate sheeting process.

The TPV compound is made up of a rubber phase that is crosslinked, with the crosslinked rubber dispersed in a plastic phase. Raw materials may be added to the TPV compound, such as oil as an extender, fillers, a curative package, and a stabilization package. The TPV will also have the positive attributes of TPO that can be processed easily in thermoplastic equipment not requiring a post cure process as in rubber.

The base polymer or rubber phase for the TPV compound may be chosen from EPDM, Butyl, Neoprene, Epichlorohydrin, Chlorosulfinated polyethylene (CSPE), or other such base polymers, with the base polymer being used, at least in part, to obtain the desired physical properties, discussed below, and weathering characteristics. The rubber polymer may also be blended to improve or provide additional properties, such as chemical resistance or improved adhesion. The plastic phase may be chosen from polypropylene, polyethylene, or co-polymers of polypropylene and polyethylene. Fillers may be talc, mica, clay, calcium carbonate, or the like. Curatives can be either phenolic resin or peroxide. With a phenolic resin cure a halogen donor would be needed and may be stannous chloride or even come from a polymer used in the formulation. Stabilizers may include UV stabilizers and antioxidants.

In general, the maximum or minimum property limits for TPV roofing membrane 24 may be approximately in the following ranges:

TABLE 1

| Tensile strength, min (psi) | 900-1100 |
|---|---|
| Elongation, min (%) | 200-300 |
| Tear resistance, min (lbf/in) | 40-150 |
| Tensile set, max % | 20-10 |
| Brittleness point, max (° F.) | (−35)-(−45) |
| Weathering (pass) (hours) | 6000-8000 |

It should be appreciated, however, that a TPV roofing membrane may be constructed with alternative or superior properties than those shown above and still function as intended. For example, a TPV roofing membrane could have a tensile strength of approximately 1,800 psi and/or a maximum percentage tensile set of under 10%.

A TPV roofing membrane having a tensile set of less than approximately 10% may enable the TPV roofing membrane to be constructed without a reinforcement layer. A roofing membrane that does not include a reinforcement layer is advantageous for several reasons. For example, elimination of the reinforcement layer saves money and decreases the processing difficulty, as well as enables the roofing membrane to retain sufficient flexibility to conform to the broad array of contour that may be associated with the roof deck surface of a movable occupancy structure.

The following table provides a compound listing in approximate parts per hundred rubber (PHR) and by approximate weight percentage of one particular formulation for a TPV suitable roofing membrane.

TABLE 2

|  | PHR | Wt. % |
|---|---|---|
| EPDM | 100 | 29.3 |
| Polypropylene | 55 | 16.1 |
| Processing oil | 123.8 | 36.3 |
| Phenolic resin | 5.9 | 1.7 |
| Stannous Chloride | 1.5 | 0.4 |
| Zinc Oxide | 2.0 | 0.6 |
| Filler | 40 | 11.7 |
| Titanium Dioxide | 11 | 3.2 |
| Antioxidant | 0.4 | 0.1 |
| UV stabilizer | 1.8 | 0.5 |

It should be appreciated that differing characteristics, properties, styles, relative amounts, or forms of the above noted compounds, or even additional or alternative compounds, may be employed within the scope of the present invention. For example, a pigment such as ultramarine blue may be added, such as in an approximate amount of 0.1 weight percent, to obtain whiter formulations of TPV roofing membranes. Likewise, methyl acrylate monomers in conjunction with peroxides may be employed to aid curing. Further, the EPDM polymer can come in different viscosities, diene types and ethylene propylene ratio. Suppliers of EPDM may include ExxonMobil, the DSM company of the Netherlands, the Chemtura (Crompton) Corp. of Connecticut, Enichem S.p.A. of Italy, and others. EPDM, as well as phenolic resin, may be obtained extended in oil, in which case the percent oil in which they are supplied should be subtracted from the total oil. Similarly, if other products are supplied extended in oil, the percent oil should also be subtracted from the total oil. The processing oil can vary by viscosity, color and type, such as parafinic, napthenic, or aromatic. Suppliers of processing oil may include ExxonMobil, Sunoco Inc., Citgo, and others.

Similarly, polypropylene of differing crytallinities, melt flows, hardness and copolymer types may be used. Polypropylene may be supplied by Exxonmobil, Sunoco, the Basell company of the Netherlands, and others. As previously noted, polyethylene may be used instead of or in combination with polypropylene. Phenolic resin may be supplied in different melt points, methylol content and could even be oil extended. The Schnectady (SI Group) of New York, as well as others, may supply phenolic resin. Stannous chloride may be supplied in either a hydrate or anhydrous form, with the anhydrous form being preferred. Suppliers of stannous chloride include Arkema of France, J.T. Baker of New Jersey, and others. Zinc oxide is used in the crosslinking of the rubber and may be supplied, for example, by Harwick Standard, of Akron, Ohio.

Numerous types of filler for the TPV roofing membrane may be employed including, for example, talc, mica, clay, calcium carbonate, and silica. The filler may also be of different types, particle sizes and surface coatings.

In the illustrated embodiment, titanium dioxide is used as a coloring pigment to create a white formulation. However, other pigments may used or added to the titanium dioxide or in place of the titanium dioxide for different coloring, with the pigments preferably being of exterior grade due to ultraviolet (UV) exposure. For exterior applications light colors will result in cooler internal temperatures for a movable occupancy structure. In addition, the antioxidants and UV stabilizers may be supplied in many forms from numerous suppliers. For example, antioxidants may include hindered phenols, amines, and others, and the UV stabilizers may include hindered amine light stabilizers HATS, hindered amine light stabilizers that have an end group to reduce the basic nature NOR-HALS, benzophenones, or benzotriazoles. Among others, suppliers of antioxidants include CIBA and suppliers of UV stabilizers include CIBA and Cytec.

The above noted formulation is based on a phenolic resin cure system. Alternatively, however, different curative systems such as peroxide cures may be employed. Furthermore, different halogen donors may be used in lieu of stannous chloride such as, for example, neoprene rubber or another halogen donor, which may add improved bonding properties to the TPV roofing membrane.

Still further, as described in more detail below, additional or alternative properties and/or characteristics of the TPV roofing membrane may be obtained by adding functional polymers to the matrix either as a post add or as a replacement before the curing reaction. Such functional polymers may include chlorine containing maleic ahydride grafts, acrylics, or arcylate/methyl acrylate monomers. This may provide more reactive sights to which the sealant may bond.

It should also be understood, however, that TPV roofing membranes having differing formulations and/or differing weight percentages may be devised and function as intended within the scope of the present invention. Such differing formulations may, for example, be constructed to obtain different desired properties, such as appearance, performance, or installation properties. For example, the below table illustrates alternative weight percentages by ranges of the above noted components that may be used in creating alternative TPV roofing membranes.

TABLE 3

|  | Approximate Wt. % range |
|---|---|
| EPDM | 25-35 |
| Polypropylene | 10-25 |
| Processing oil | 23-43 |
| Phenolic resin | 1-3 |
| Stannous Chloride | 0.2-0.7 |
| Zinc Oxide | 0.3-0.8 |
| Filler | 0.0-25 |
| Titanium Dioxide | 0.0-10 |
| Antioxidant | 0.0-0.25 |
| UV stabilizer | 0.0-1.5 |

Still further, other alternatives may include a peroxide cure employed in place of the phenolic resin and stannous chloride combination.

Constructing alternative TPV roofing membranes formed from varying formulations of the above or other compounds with sufficient tensile set characteristics, as well as tensile strength and elongation properties, may advantageously enable the TPV roofing membrane to be applied to an occupancy structure without the need for a reinforcement layer, which in turn may enable additional processing and cost advantages.

Referring again to FIGS. 1 and 2, and as previously noted, substantially solid sealant 38 is applied about roofing members to inhibit moisture from passing TPV roofing membrane 24 at the apertures through which the roofing members extend, or at the joints formed between the roof members and roofing membranes, to thereby prevent damage to the roof 22 of the mobile occupancy structure. In the illustrated embodiment substantially solid sealant 38 is formed of 100% solids. Alternatively, a substantially solid sealant for sealing an occupancy structure roofing membrane may be formed of approximately 90% or more solids, such as for example approximately 95 to 98% solids. The solids portion of the substantially solid sealant is that portion that does not evaporate, including processing oil. Some amount of flow of the substantially solid sealant 38 is required during application of sealant 38 to mobile occupancy structure 20.

It should be appreciated that the greater the percentage of solids, the lower the percentage of solvents and, thus, the amount of solvent evaporation. The reduction of solvent evaporation promotes a reduction in shrinkage of the sealant, which aids in preventing unwanted cracking of the solid portion of the sealant left behind after evaporation. Typically such cracks form at the transition between the roofing membrane and the flange of a roof member that is being sealed. Such cracking may provide leak paths for moisture to pass by the sealant and damage the roof 22 of the mobile occupancy structure 20. Reducing shrinkage promotes adhesion of sealant 38 to the roof members and roofing membrane 24 as sealant shrinkage may cause a sealant to pull away from a roof member and/or roofing membrane to which it has been applied. Still further, the reduction of solvents reduces solvent evaporation, which in turn reduces the hazardous air pollutants (HAP) and volatile organic compounds (VOC) generated during production of mobile occupancy structures. In solvent based sealants, the solvent enables the sealant to flow during application. After application of the sealant, the solvent is released or evaporates. Solvents employed may include toluene, xylene, naptha, mineral spirits, ketones, hexane, and heptane, amongst others.

Substantially solid sealants may be developed as a single component, two component or a hot melt systems, and may include sealant types such as urethanes and/or silicones. Single and two component sealants may be comprised of polyurethane, silicones, modified silicone (MS) polymer, polysulfide, epoxy, acrylic, or the like. A single component sealant may be configured to cure upon contact with moisture and a two component system may be configured to cure upon mixing of the two components together. Hot melt systems, which are heated and cure upon cooling, may range from ethylene vinyl acetate (EVA), thermoplastic olefin (TPO), polyolefin plastomers, amorphous polyalpha olefins (APAO), block copolymers such as styrene isoprene styrene (SIS), styrene butylene styrene (SBS), styrene ethylene butylene styrene (SEBS), styrene ethylenepropylene styrene (SEPS), or the like. Hot melt systems may also comprise propylene, ethylene, butyl rubber, chlorosulfonated polyethylene, ethylene propylene rubber EPR, ethylene propylene diene terpolymer (EPDM), polyisobutylene (PIB), or the like.

Substantially solid sealants may be formed in a high speed mixer or reactor, or may be formed in a sigma blade mixer or a twin screw extruder, with the particular type of substantially solid sealant determining the type of equipment being used to manufacture the sealant. Production equipment for producing a hot melt substantially solid sealant may require a heated jacket to reach the required temperature to enable mixing. Reactive type substantially solid sealants may require the presence of an inert gas in the tank during mixing and packaging operations. The substantially solid sealant requires a viscosity sufficient to enable the sealant to be applied using sealant application equipment. For example, substantially solid sealants being applied at room temperature may have a viscosity range between 50,000 to 2,000,000 centipoise, and hot melt substantially solid sealants may have a viscosity range between 2,000 and 1,500,000 centipoise at 350 degrees Fahrenheit.

The substantially solid sealant requires good adhesion to the roofing membrane, as well as to metals and plastics, such as which the flange of a roof member may be formed. This can be accomplished with the use of tackifying resins and the polymer sealant bonding additive. Substantially solid sealants also require excellent oxidation and UV resistance, which may be obtained using antioxidants and UV stabilizers. Some pigments affecting the opacity of the sealant may also aid in UV resistance, such as titanium dioxide or carbon black. The sealant also needs to be resistant to water, which is achieved by the selection of the polymer and other ingredients. The service temperature must withstand minus 20 degrees Fahrenheit to 160 degrees Fahrenheit. The low end of the range can be adjusted by the polymer chosen for the sealant or by adding plasticizers, such as paraffinic oil or polybutene, that will lower the glass transition temperature. The selection of these components must be balanced to maintain the upper service temperature, which an be affected by the selected polymer, the amount of plasticizer, and the melt point of tackifying resin, or any olefin waxes that may be used. Fillers may be used to aid drying of the sealant so that it is not tacky. The substantially solid sealant may be non-sagging or self leveling depending upon application and customer requirements. The sealants may be made non-sagging by the addition of thixotropes.

Although described herein in reference to mobile occupancy structures, the substantially solid sealants of the present invention may also be utilized in roofing structures other than mobile occupancy structures, such as stationary commercial buildings.

In particular embodiments, a TPV roofing membrane 24 and/or a substantially solid sealant 38 may be formulated to include particular polymer sealant bonding additives to promote bonding or adhesion between the roofing membrane 24 and sealant 38. That is, a substantially solid sealant and a TPV roofing membrane are formulated in a compatible manner to promote adhesion there between. Compatible formulations of TPV roofing membranes and substantially solid sealants enable the sealants to bond to the TPV roofing membrane and a roofing member without having to first apply a primer to the TPV roofing membrane. Specifically, a sealing system with cooperatively formulated substantially solid sealant and TPV roofing membrane formulations enables the sealant to be applied without a primer on the roofing membrane while ensuring a sufficient bond with the roofing membrane and roofing member to inhibit the formation of leaks about the roof members. The sealant polymer bonding additive may comprise the base polymer of the substantially solid sealant, or may be a separate polymer bonding additive depending on the particular TPV polymer bonding additive of the TPV roofing membrane to which the substantially solid sealant will be adhered.

For example, the TPV roofing membrane and substantially solid sealant may be formulated or modified with compatible polymers to increase the adhesion of the substantially solid sealant with the roofing membrane. This may include adding or adjusting functional groups in the TPV roofing membrane formulation to promote bonding while still maintaining the long term weathering characteristics of the roofing membrane. For example, polymer types may be blended in the TPV roofing membrane, such as neoprene or a maleic anhydride grafted polymer, such as Exxelor from ExxonMobil. Possible polymer additives may include halogenated polymers, ethylene vinyl acetate, ethylene/acrylates, reactive olefins with maleic anhydride grafts or glycidyl methacrylate, styrene block polymers, and thermoplastic olefins. Still further, the various above noted sealant raw materials may also be modified with functional groups such as malaeic anhydride, carboxylic acid, silanes, acrylates, methacrylate, and the like. Still further, other ingredients such as plasticizers, tackifying resins, antioxidants, UV stabilizers, fillers, pigments, adhesion promoters, catalysts, curatives, or the like, may be added to the sealant and/or TPV roofing membrane to promote bonding there between.

Two general modes of promoting bonding by polymer sealant bonding additives are contemplated with the roofing system. The first is by the promotion of mechanical bonding between the sealant and roofing membrane. For example, mechanical bonding promoting polymer sealant bonding additives may be introduced to the TPV roofing membrane material that modify the surface of the TPV roofing membrane material by making the surface receptive to the sealant. In particular embodiments, polymer sealant bonding additives may be introduced having polar groups that will bond with polar groups in the sealant. As described below, a substantially solid sealant containing EVA has increased bonding affinity to a TPV roofing membrane modified with EVA, and to TPV roofing membranes modified with ethylene/acrylate polymers and grafted polymers. Likewise, a substantially solid sealant containing SEBS has increased bonding affinity to a TPV roofing membrane modified with SEBS, likely mainly through end block attraction. Alternative mechanical bonding promoting polymer sealant bonding additives may act not by polar groups, but rather by a fusing reaction, In the case of a hot melt substantially solid sealant, which is applied by heating the substantially solid sealant to a temperature at which it will flow adequately, the heat from the melted substantially solid sealant may enable a mechanical bonding reaction between the sealant and TPV roofing membrane. For example, a heat melt substantially solid sealant containing TPO may have increased bonding affinity to a TPV roofing membrane modified with TPO through such a mechanical bonding in like manner to a heat welded bond of TPO membranes.

The second contemplated mode of promoting bonding by polymer sealant bonding additives is through chemical reaction such as, for example, by a reaction between a maleic anhydride grafted polymer and a gylcidyl methacrylate grafted polymer. The maleic anhydride reacts with the epoxy ring of the gylcidyl methacrylate at approximately 250 degrees Fahrenheit. Applying a hot melt substantially solid sealant, which is applied at a temperature of approximately 350 degrees Fahrenheit or greater, may enable such a chemical reaction to take place. In the example discussed below, the TPV roofing membrane is modified with the maleic anhydride grafted polymer and a hot melt substantially solid sealant includes the gylcidyl methacrylate grafted polymer. It should be appreciated, however, that the presence of the respective polymer sealant bonding additives in the roofing membrane and substantially solid sealant could be switched. Additionally, in the example discussed below, the gylcidyl methacrylate grafted polymer is used in a substantially solid sealant also containing EVA. Inclusion of gylcidyl methacrylate grafted polymer as a polymer sealant bonding additive may also be used with other hot melt sealants, such as hot melt sealants including styrene block polymers and olefins. It should also be appreciated that alternative polymer sealant bonding additives may be employed producing alternative chemical reaction type bonding other than the reaction of the maleic anhydride grafted polymer with the epoxy ring of the gylcidyl methacrylate grafted polymer.

The polymer sealant bonding additives may be introduced to the TPV roofing membrane at various stages in the production process for forming the TPV roofing membrane depending on whether a functional group is present on the particular polymer sealant bonding additive being introduced that would react during the crosslinking of the rubber phase of the TPV material. Polymer sealant bonding additives including a functional group that would compete with the crosslinking rubber phase reaction would be introduced after the curing reaction has occurred. This may occur in a single pass operation if the TPV material production equipment is of sufficient length. Alternatively, the TPV material may be pelletized prior to a sheeting operation, in which case the polymer sealant bonding additive and pelletized TPV material may be, for example, combined in the extruder or at a calendar when processing the material into sheeting at a separate operation. Polymer sealant bonding additives that do not interfere with the TPV material curing reaction may be introduced during the initial mixing of the ingredients or after the curing process, including by combining with pelletized TPV material when processing the material into sheeting.

Table 4 below provides examples of TPV roofing membranes modified with polymer sealant bonding additives, with the amount of polymer sealant bonding additive shown by weight percentage. Also disclosed is the trade name and supplier of the particular polymer sealant bonding additive used. The referenced base TPV is taken from the TPV formulation described in Table 2.

TABLE 4

|  | Polymer Sealant Bonding Additive | Trade Name | Supplier | Additive (Wt. %) | Base TPV (Wt. %) |
| --- | --- | --- | --- | --- | --- |
| Base TPV | No Additive | — | — | — | 100 |
| Sample 1 | styrene ethylene butylene styrene block polymer (SEBS) | Septon 8007 | Kuraray Co. Ltd. | 9.1 | 90.9 |
| Sample 2 | maleic anhydride grafted polymer (MAH) | Exxelor 1803 | ExxonMobil | 9.1 | 90.9 |
| Sample 3 | acrylate modified polymer | Lotryl 30BA02 (butyl acrylate) | Arkema Inc. | 9.1 | 90.9 |
| Sample 4 | ethylene vinyl acetate (EVA) | Evatane 28-40 | Arkema Inc. | 9.1 | 90.9 |
| Sample 5 | thermoplastic polyolefin (TPO) | Hifax CA10A | Basell | 16.7 | 83.3 |

Table 5 discloses certain material properties of the TPV roofing membrane formulations of Samples 1-5 of Table 4, disclosing that the properties are within the desired material parameters of Table 1.

TABLE 5

|  | Tensile Strength (psi) | Elongation (%) | Tensile Set (%) |
| --- | --- | --- | --- |
| Base TPV | 1443 | 510 | 6.8 |
| Sample 1 | 1134 | 500 | 5.5 |
| Sample 2 | 1496 | 475 | 7.3 |
| Sample 3 | 1003 | 350 | 7.8 |
| Sample 4 | 1192 | 520 | 8.2 |
| Sample 5 | 1229 | 450 | 7.7 |

Alternative suppliers, formulations, and polymer bonding additives may be employed relative to those shown in Table 4. For example, SEBS block polymer may be supplied by Kraton Polymers LLC (trade name "Kraton") or Kurray Co. LTD, MAH grafted polymer may be supplied by Arkema (trade name "Orevec" and "Lotader") or ExxonMobil (trade name "Exxelor"), and EVA may be supplied by ExxonMobil or Dupont (trade name "Elvax"), and TPO may be supplied by Basell (trade name "Hifax"), ExxonMobil (trade name "Exxact") or Dow (trade name "Affinity"). Similarly, other acrylate modified polymers may be used other than the butyl acrylate used in TPV roofing membrane Sample 3, such as methyl acrylate and ethyl hexyl acrylate.

The polymer bonding additive in the TPV roofing membrane is likely required to be supplied in the range of at least approximately 3% by weight of the TPV formulation in order to promote adhesion with the sealant. The upper limit of the polymer bonding additive being dictated by the production of a TPV roofing membrane meeting the parameters of Table 1.

Tables 6-9 disclose four substantially solid sealant formulations that include polymer sealant bonding additives, with the polymer sealant bonding additives and other components shown by weight percentage. Also disclosed is the trade name and supplier of the particular polymer sealant bonding additive and certain other components used.

TABLE 6

Sealant Sample 1 (SEBS Based Sealant)

| Component | Trade Name | Supplier | Wt. % |
|---|---|---|---|
| SEBS | Septon 8007 | Kurray Co. LTD. | 10.3 |
| Tackifying resin | Eastotac H130E | Eastman | 20.5 |
| Polybutene | TPC-1160 | Texas Petroleum | 28.2 |
| APAO | Eastoflex P1023 | Eastman | 10.3 |
| Antioxidant | Iragnox 1010 | Ciba | 0.5 |
| Calicium carbonate | | | 18.0 |
| Titanium dioxide | | | 6.1 |
| Zinc oxide | | | 6.1 |

TABLE 7

Sealant Sample 2 (EVA Based Sealant)

| Component | Trade Name | Supplier | Wt. % |
|---|---|---|---|
| ethylene propylene diene terpolymer (EPDM) | VN 722 | ExxonMobil | 8.0 |
| ethylene vinyl acetate (EVA) | Evatane 33-400 | Arkema | 32.3 |
| Parafinic oil | Sunpar 150 | Sunoco | 5.4 |
| Tackifying resin | Escorez 5600 | ExxonMobil | 26.9 |
| Antioxidant | Irganox 1010 | Ciba | 0.5 |
| Calicium carbonate | | | 24.2 |
| Titanium dioxide | | | 2.7 |

TABLE 8

Sealant Sample 3 (EVA and gylcidyl methacrylate Based Sealant)

| Component | Trade Name | Supplier | Wt. % |
|---|---|---|---|
| gylcidyl methacrylate (GMA—reactive PE) | Lotader AX8300 | Arkema | 10.9 |
| ethylene vinyl acetate (EVA) | Evatane 33-400 | Arkema | 31.3 |
| Parafinic oil | Sunpar 150 | Sunoco | 5.2 |
| Tackifying resin | Escorez 5600 | ExxonMobil | 26.0 |
| Antioxidant | Irganox 1010 | Ciba | 0.5 |
| Calicium carbonate | | | 23.5 |
| Titanium dioxide | | | 2.6 |

TABLE 9

Sealant Sample 4 (TPO Based Sealant)

| Component | Trade Name | Supplier | Wt. % |
|---|---|---|---|
| TPO | Hifax Z108S | Basell | 24.9 |
| Parafinic oil | Sunpar 150 | Sunoco | 16.6 |
| Polybutene | TPC 1160 | Texas Petroleum | 16.6 |
| Tackifying resin | Escorez 5400 | ExxonMobil | 21.6 |
| Antioxidant | Irganox 1010 | Ciba | 0.3 |
| Calicium carbonate | | | 18.3 |
| Titanium dioxide | | | 1.7 |

Sealant Samples 1-4 of Tables 6-9 are hot melt sealants that are 100% solid sealants. Substantially solid sealant Sample 1 of Table 6 includes a sealant SEBS block polymer bonding additive. Substantially solid sealant Sample 2 of Table 7 includes a sealant EVA polymer bonding additive. Substantially solid sealant Sample 3 of Table 8 includes sealant EVA and gylcidyl methacrylate (GMA) grafted polymer bonding additives. Substantially solid sealant Sample 4 of Table 9 includes a TPO polymer bonding additive. Although not included, the sealant formulations could also contain UV light absorbers or stabilizers for enhancing long term weathering.

The TPV roofing membranes of Table 4 were tested for adhesion strength and failure mode in connection with various of the substantially solid sealants of Tables 6-9. The sealants were applied at 350 degrees Fahrenheit with fabric in the middle of the sample and the samples were allowed to age seven days prior to a peel test being performed at 2 inches per minute on a universal tester. The results of these peel tests are shown in Tables 10-13 below with comparison being made with the base TPV roofing membrane formulation of Table 2 for reference. The indicated pounds force is the resistive force of separation when peeled at the rate of 2 inches per minute.

TABLE 10

Sealant Sample 1 - SEBS Based Sealant

| Base TPV Membrane | | TPV Sample 1 (SEBS Modified Membrane) | |
|---|---|---|---|
| lbs. force | Failure mode | lbs. force | Failure mode |
| 1.18 | 100% cf | 1.38 | 100% cf |

TABLE 11

Sealant Sample 3 - EVA + GMA Based Sealant

| Base TPV Membrane | | TPV Sample 2 (MAH Modified Membrane) | |
|---|---|---|---|
| lbs. force | Failure mode | lbs. force | Failure mode |
| 6.60 | 80% af | 10.98 | 100% cf |

TABLE 12

Sealant Sample 2 - EVA Based Sealant

| Base TPV Membrane | | TPV Sample 4 (EVA Modified Membrane) | |
|---|---|---|---|
| lbs. force | Failure mode | lbs. force | Failure mode |
| 7.14 | 50% af | 8.25 | 100% cf |

TABLE 13

Sealant Sample 4 - TPO Based Sealant

| Base TPV Membrane | | TPV Sample 5 (TPO Modified Membrane) | |
|---|---|---|---|
| lbs. force | Failure mode | lbs. force | Failure mode |
| 7.20 | 100% cf | 10.08 | 100% cf |

The failure mode designation "cf" signifies a cohesive failure, which is a failure within the sealant. The failure mode designation "af" signifies an adhesive failure, which is a clean parting off the TPV roofing membrane. It is desirable to have a completely (100%) cohesive failure with the highest load or force. In the testing indicated above in Tables 10-13, the difference in the load when the mode of failure of a substantially solid sealant is consistent between the membrane types is related to the amount of material left on the sample or the depth of residue. As the depth of residue increases the load value increases.

As shown in Tables 10-13 above, bonding force between the sealant including a sealant polymer bonding additive and the TPV membrane improved in each case with the TPV membrane including a TPV polymer bonding additive relative to the base TPV membrane.

Alternative combinations of polymer bonding additives or bases may be employed to provide compatibly formulated TPV roofing membranes and substantially solid sealants to improve bonding there between. For example, the TPV polymer bonding additive may comprise an ethylene-n-butyl acrylate, an ethylene-methyl acrylate, or an ethylene 2-ethyl hexyl acrylate, with the sealant polymer bonding additive comprising an ethylene vinyl acetate (EVA). Either the TPV or sealant polymer bonding additive may comprise a gylcidyl methacrylate (GMA) with the other of the TPV or sealant polymer bonding additive comprising a maleic anhydride grafted polymer (MAH).

The sealant polymer bonding additive in the sealant is likely required to be supplied in the range of at least approximately 3% by weight of the sealant formulation in order to promote adhesion with the TPV roofing membrane. The upper limit of the added sealant polymer bonding additive being determined by the sealant properties of viscosity, flow during application, such as when heated in the case of a hot melt substantially solid sealant, and flow during production of the sealant, as well as being non-tacky upon curing after application.

Referring again to FIGS. 1-3, TPV roofing membrane 24 is constructed as a unitary, finished product formed as a single layer and having a thickness in the range of approximately 0.02 inches to 0.05 inches. However, alternative roofing membranes incorporating multiple layers with at least one of the layers being a TPV membrane may be constructed and still function as intended within the scope of the present invention. Such alternative layers may be constructed or selected to have alternative properties for a particular application characteristic, for example, slight changes between the formulations of the layers by adding different polymers may be employed for adhesion promotion or chemical resistance. Still further, a TPV roofing membrane may have an outer layer with improved weathering characteristics, such as by the inclusion of UV stabilizers, and an inner layer that is adapted for adherence to the roof of a mobile occupancy structure. Additionally or alternatively, the outer layer may be formulated to have particular color appearance characteristics. It should also be appreciated that reinforcement layers, such as fabric reinforcement layers, may also be employed with single or multi-ply TPV roofing membranes. Such reinforcement layers may be utilized to provide still further support and enhanced bonding surface.

Figure 4:
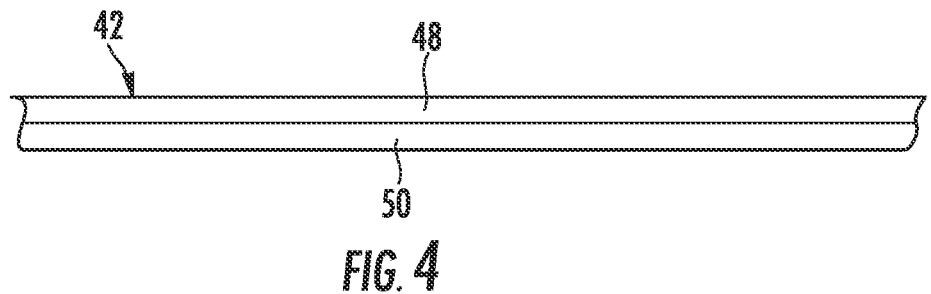
FIG. 4 is a partial side elevation view of an alternative TPV roofing membrane in accordance with the present invention.
Figure 4A:
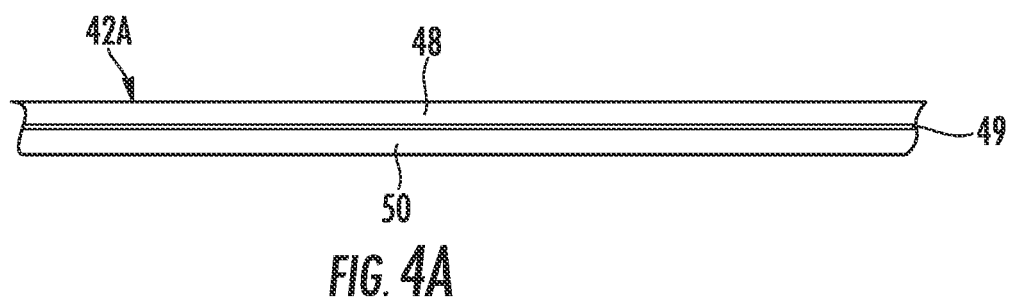
FIG. 4A is a partial side elevation view of a modified TPV roofing membrane of FIG. 4 disclosing the inclusion of a reinforcement layer.
Figure 5:
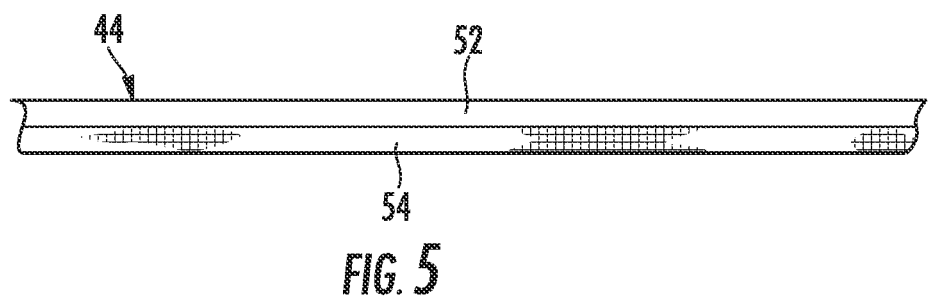
FIG. 5 is a partial side elevation view of another alternative TPV roofing membrane in accordance with the present invention.
Figure 6:
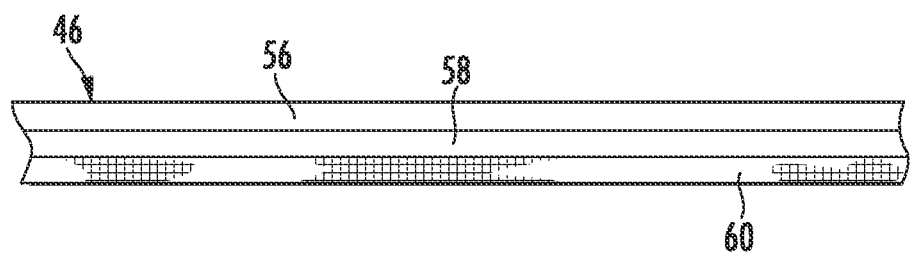
FIG. 6 is a partial side elevation view of another alternative TPV roofing membrane in accordance with the present invention.

As understood from FIGS. 4-6, alternative TPV roofing membranes, such as TPV roofing membranes 42, 42A, 44, 46, respectively, may be utilized. TPV roofing membrane 42 of FIG. 4 is a two-ply membrane in which both layers are formed as TPV membranes. Outer TPV membrane 48, for example, may have a thickness of approximately 0.005 inches to 0.045 inches and be formulated as a weathering surface with UV stabilizers. Inner TPV membrane 50, also by way of example, may have a thickness of approximately 0.005 inches to 0.045 inches and be formulated without UV stabilizers as a cost savings and function as a base layer to be adhered to the roof of the occupancy structure. Because of the TPV nature it could also be adhered to a TPO or EPDM layer if so desired. As shown in FIG. 4A, a reinforcement layer or a fabric layer 49 may be sandwiched between outer and inner layers 48, 50. Such a fabric layer may be constructed of a weft insert or woven material and function to prevent TPV roofing membrane 42A from being over stretched during application to a roof of an occupancy structure. Still further, an alternative reinforcement layer or fabric layer may be disposed against the surface of inner layer that is to be affixed to the roof. Such a reinforcement layer could be formed from a fleece, weft, woven, coated product, or the like.

The roofing membrane shown in FIG. 5 illustrates an alternative two-layer TPV roofing membrane 44 having an outer TPV membrane layer 52 and an inner fabric layer 54 adapted to be adhered to a roof of an occupancy structure. The roofing membrane of FIG. 6 illustrates a three-layer TPV roofing membrane 46 having an outer TPV membrane layer 56, a middle TPV membrane layer 58, and an inner fabric layer 60 adapted to be adhered to a roof of an occupancy structure. The outer TPV membrane layers 52, 56 of FIGS. 5 and 6, respectively, may, for example, incorporate UV stabilizers or UV screeners, such as pigments, for weathering resistance. It should be appreciated that the phrase "at least one" TPV membrane may refer to a roofing membrane comprising a single ply or layer.

Figure 7:
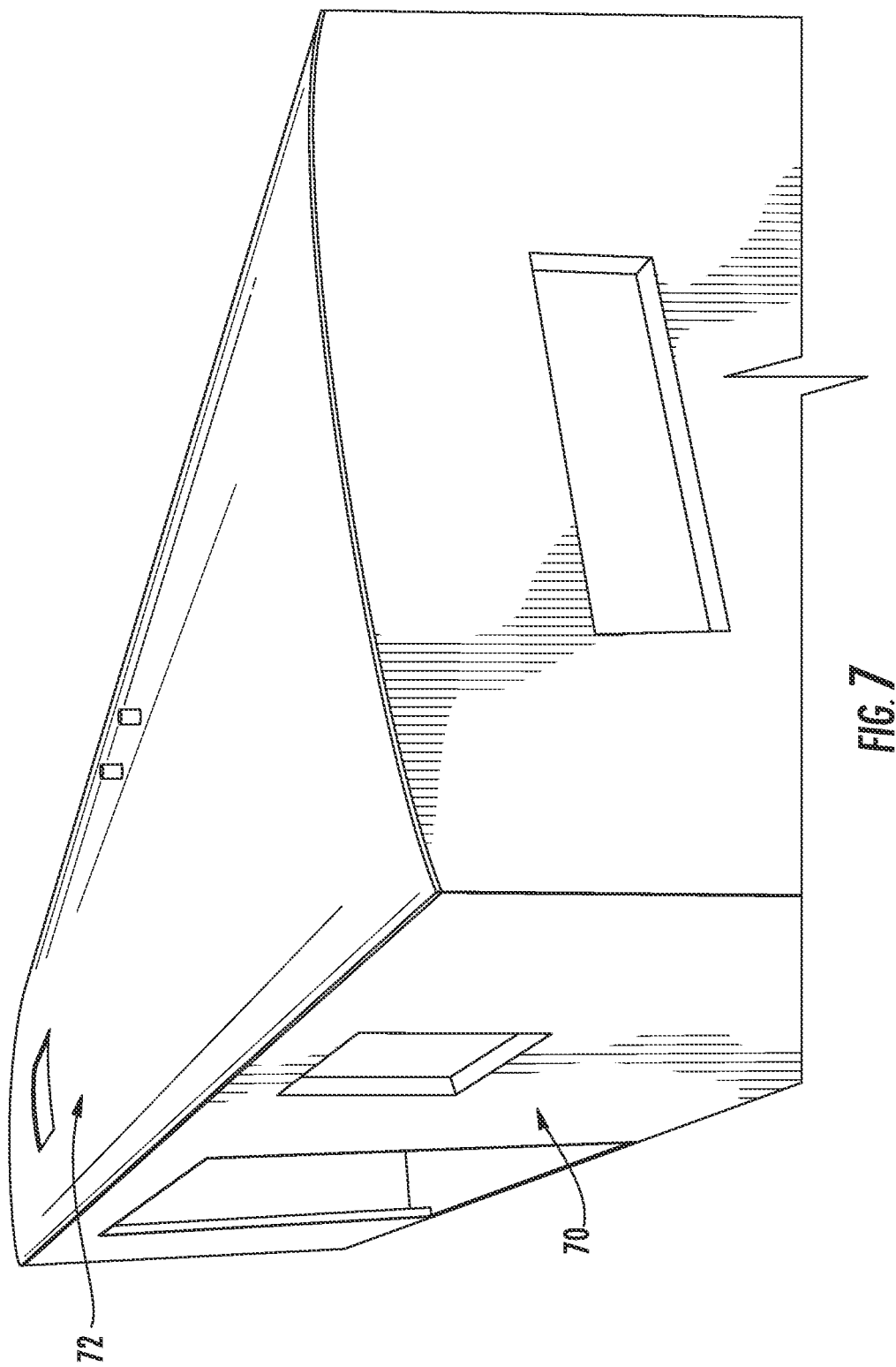
FIG. 7 is a perspective view of an occupancy structure prior to application of a roofing membrane.
Figure 8:
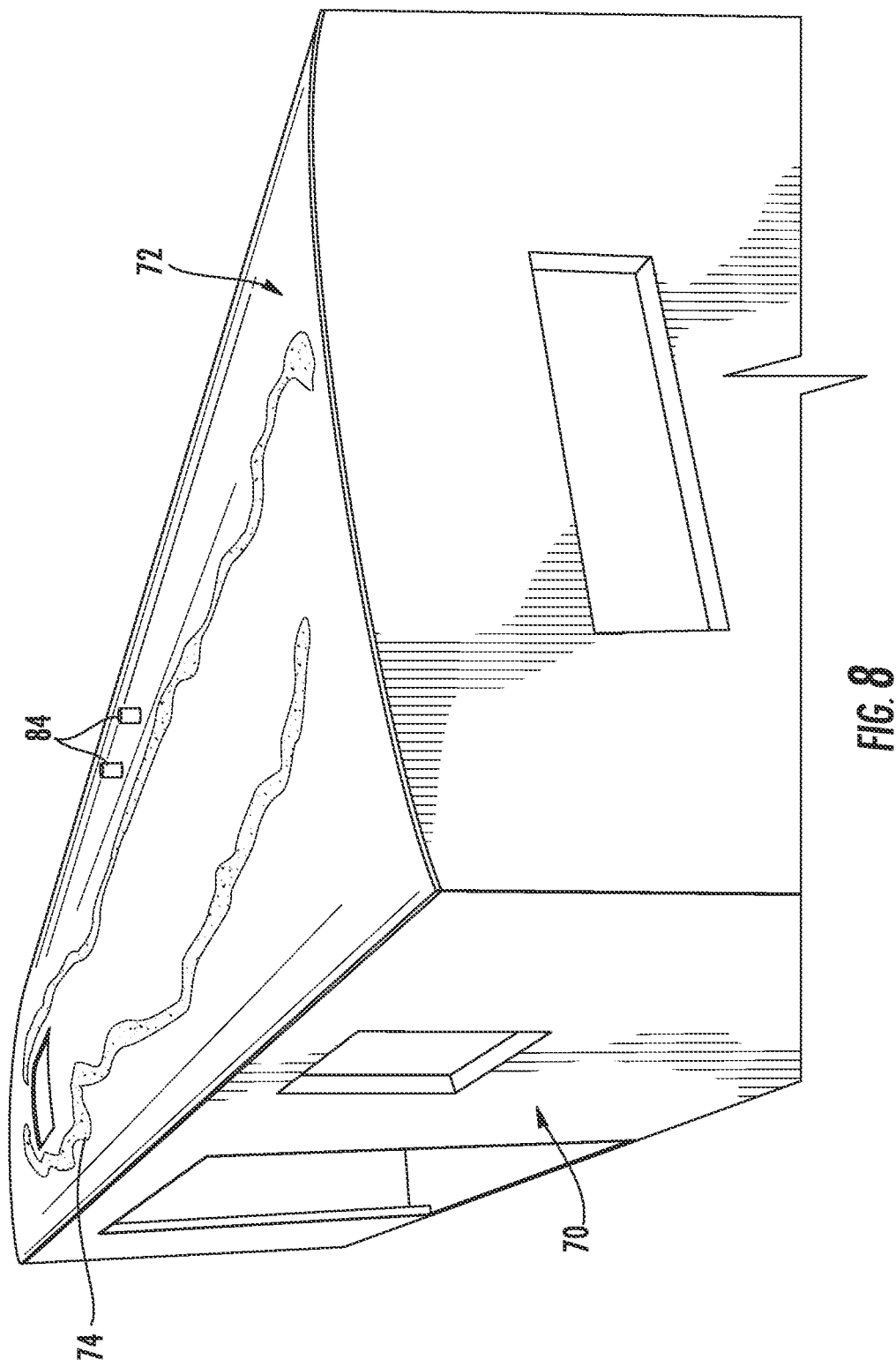
FIGS. 8 and 9 are perspective views of the occupancy structure of FIG. 7 to which adhesive is being applied to the roof.
Figure 9:
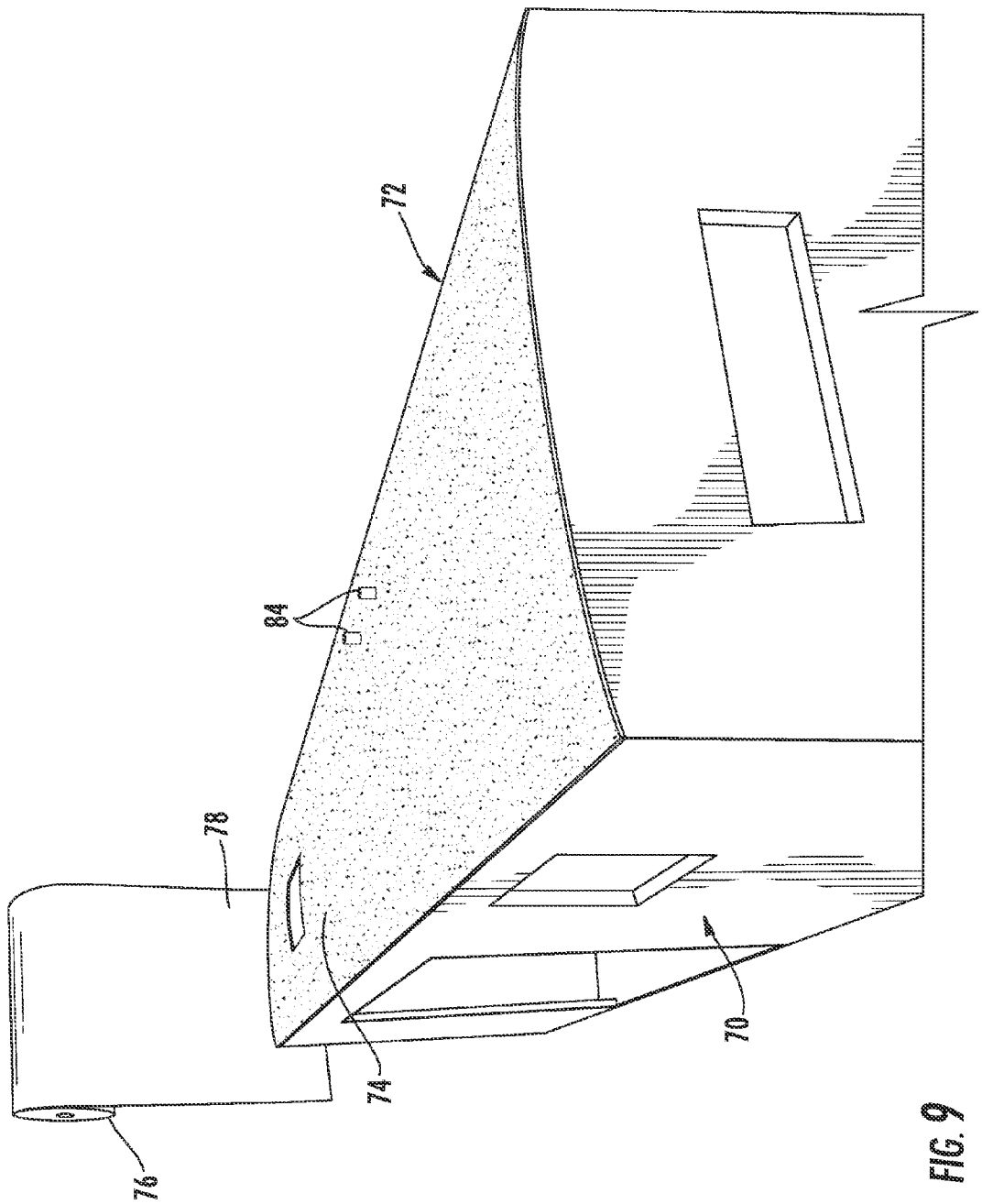

The assembly of an occupancy structure with a TPV roofing membrane will now be described with reference to FIGS. 7-11. FIG. 7 illustrates a mobile occupancy structure 70 having a roof 72. Roof 72 is constructed to include trusses (not shown) over which oriented strand board (OSB) is mounted to form a substrate. Alternatively, luan board, plywood, or the like, may be used in place of OSB. As shown in FIGS. 8 and 9, an adhesive 74 is applied to the roof 72. In the illustrated embodiment adhesive 74 is a water based adhesive and is applied by rolling to cover roof 72 (FIGS. 9 and 10). It should be appreciated, however, that alternative adhesives and application methods may be utilized. FIG. 10 is representative of a roll 76 of TPV roofing membrane 78 positioned adjacent to the occupancy structure 70 such that TPV roofing membrane 78 may be pulled over and adhered to roof 72 by adhesive 74. Finally, as shown in FIG. 11, TPV roofing membrane 78 is smoothed and apertures or holes 80, 81 are cut into TPV roofing membrane 78 to enable roofing members, such as vent 84 and skylight 86, respectively, to extend from roof 72 through TPV roofing membrane 78. As also shown in FIG. 11, the side flashing caps 88 and end flashing cap 90 roofing members are installed. A substantially solid sealant, not shown in FIGS. 7-11, is then disposed about the roofing members as a sealant.

Although the substantially solid sealant is described above in connection with a TPV roofing membrane it should be appreciated that alternative roofing membranes, such as TPO and/or EPDM roofing membranes, may be constructed to be compatible with substantially solid sealants as well. For example, particular formulations of TPO and/or EPDM roofing membranes on the one side and solid sealants on the other may be formulated to be compatible to enable a sufficient bond to the roofing membrane and roof member while avoiding the need for the application of a primer to promote bonding. Such roofing systems would still provide the advantages associated with elimination of solvent based sealants. For example, a substantially solid sealant including a TPO sealant polymer bonding additive should be compatible with a TPO roofing membrane.

Likewise, although the above described trailer 20 employs a substantially solid sealant 38 with TPV roofing membrane 24, it should also be appreciated that a conventional solvent based sealant may be employed with a TPV roofing membrane, such as any of the TPV roofing membranes 24, 42, 44, and 46 described above, with the TPV roofing membrane still functioning as intended within the scope of the present invention. Such roofing systems would still provide the advantages associated with TPV roofing membranes. For example, a solvent based sealant may be formulated to include a sealant polymer bonding additive promoting adhesion with a TPV roofing membrane including a compatible TPV polymer bonding additive.

Still further, although not shown, roof members may alternatively or additionally be coated with a film that is compatible to the roofing membrane such that they may be heat welded together, or the roofing membrane material may be used in the manner of a welding rod or coil to form a seal. For example, the flange area on a vent could be coated with a material compatible for such bonding with a TPV roofing membrane. Alternatively, based on the compatibility of the roofing membrane with the roof members, a thermoplastic roofing membrane may be heat weldable to or about the roof members without the requirement of a coating or film.

It should also be appreciated that while the above TPV roofing membrane 24 is discussed and described in connection with trailer 20, that TPV roofing membrane 24 is well adapted for use with other occupancy structures to which roofing membranes are applied, including recreational vehicles, such as trailers and motor homes, mobile homes, and trailers for use as temporary offices and classrooms, or the like.

The TPV roofing membrane for roofing a mobile occupancy structure of the present invention has both elastic and plastic like properties which provide it with the flexibility of rubber and the processing of plastic. As such, the TPV roofing membrane is readily formed and applied to occupancy structures having a roof with multiple curves or radiuses and is well adapted to provide good weathering characteristics. The TPV roofing membrane also provides sufficient strength and stretch characteristics such that it may be installed to an occupancy structure without the inclusion of a reinforcement layer. Still further, the TPV roofing membrane is heat weldable such that it may be readily reworked if required and/or may be processed with heat sealing operations. In addition, the substantially solid sealant of the present invention having at least approximately 90% or more solids may be used with the TPV roofing membrane or another roofing membrane, such as an EPDM or TPO roofing membrane. The substantially solid sealant includes a sealant polymer bonding additive compatible with the roofing membrane, which may include a roofing polymer bonding additive, to avoid the need for application of a primer to the roofing membrane while inhibiting shrinkage of the sealant during curing and the associated problems of cracking and poor adhesion while promoting sufficient bonding of the sealant to both the disparate materials of the roofing membrane and roof members.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A method of roofing an occupancy structure, said method comprising:
   providing a roofing membrane that comprises at least one thermoplastic membrane layer, said roofing membrane provided for bonding to the roof of an occupancy structure, where the occupancy structure includes a roof member that is at least partially constructed of a plastic material and extends above said roofing membrane when said roofing membrane is applied to the occupancy structure;
   providing a substantially solid hot melt thermoplastic sealant;
   heating said substantially solid hot melt thermoplastic sealant to enable said substantially solid hot melt thermoplastic sealant to flow; and
   applying a layer of said substantially solid hot melt thermoplastic sealant to an exterior surface of said thermoplastic membrane layer and a plastic portion of the roof member after said roofing membrane is bonded to the roof to seal the joint between said roofing membrane and the roof member.

2. The method of claim 1, wherein said substantially solid hot melt thermoplastic sealant comprises at least approximately 90 percent solids by weight prior to use.

3. The method of claim 2, wherein said substantially solid hot melt thermoplastic sealant comprises at least approximately 100 percent solids by weight prior to use.

4. The method of claim 1, wherein said thermoplastic membrane layer comprises at least 20 percent by weight of a plastic phase.

5. The method of claim 4, wherein said plastic phase comprises polypropylene.

6. The method of claim 1, wherein said substantially solid hot melt thermoplastic sealant includes an ultraviolet (UV) light stabilizer.

7. The method of claim 1, wherein said thermoplastic membrane layer includes a polymer bonding additive, and wherein said polymer bonding additive interacts with said substantially solid hot melt thermoplastic sealant during said applying a layer of said substantially solid hot melt thermoplastic sealant to an exterior surface of said thermoplastic membrane layer and a plastic portion of the roof member to promote adhesion of said substantially solid hot melt thermoplastic sealant with said roofing membrane.

8. The method of claim 7, wherein said substantially solid hot melt thermoplastic sealant includes a sealant polymer bonding additive, said polymer bonding additive and said sealant polymer bonding additive interacting to promote adhesion.

9. The method of claim 8, wherein said polymer bonding additive and said sealant polymer bonding additive promote adhesion by molecular interaction.

10. The method of claim 1, wherein the occupancy structure includes a plurality of roof members that are at least partially constructed of a plastic material, and wherein said applying a layer of said substantially solid hot melt thermoplastic sealant to an exterior surface of said thermoplastic membrane layer and a plastic portion of the roof member comprises applying a layer of said substantially solid hot melt thermoplastic sealant to an exterior surface of said thermoplastic membrane layer and a plastic portion of the roof members to seal the joints between said roofing membrane and the roof members.

11. The method of claim 1, wherein the roof member is completely constructed of a plastic material.

12. The method of claim 1, wherein said thermoplastic membrane layer comprises a thermoplastic (TPV) membrane layer.

13. A method of roofing a mobile occupancy structure, said method comprising:
   providing a roofing membrane that comprises at least one thermoplastic membrane layer, said roofing membrane provided for bonding to the roof of a mobile occupancy structure, where the mobile occupancy structure includes a roof member that is at least partially constructed of a plastic material and extends above said roofing membrane when said roofing membrane is applied to the mobile occupancy structure;

providing a substantially solid hot melt thermoplastic sealant, said substantially solid hot melt thermoplastic sealant comprising at least approximately 90 percent solids by weight prior to use and including an ultraviolet (UV) light stabilizer;

heating said substantially solid hot melt thermoplastic sealant to enable said substantially solid hot melt thermoplastic sealant to flow; and applying a layer of said substantially solid hot melt thermoplastic sealant to an exterior surface of said thermoplastic membrane layer and a plastic portion of the roof member after said roofing membrane is bonded to the roof to seal the joint between said roofing membrane and the roof member.

14. The method of claim 13, wherein said substantially solid hot melt thermoplastic sealant comprises at least approximately 100 percent solids by weight prior to use.

15. The method of claim 13, wherein said thermoplastic membrane layer comprises at least 20 percent by weight of a plastic phase.

16. The method of claim 15, wherein said plastic phase comprises polypropylene.

17. A method of roofing a mobile occupancy structure, said method comprising:

providing a roofing membrane that comprises at least one thermoplastic membrane layer, said thermoplastic membrane layer comprising at least 20 percent by weight of a plastic phase, said roofing membrane provided for bonding to the roof of a mobile occupancy structure, where the mobile occupancy structure includes a roof member that is at least partially constructed of a plastic material and extends above said roofing membrane when said roofing membrane is applied to the mobile occupancy structure;

providing a substantially solid hot melt thermoplastic sealant, said substantially solid hot melt thermoplastic sealant comprising at least approximately 90 percent solids by weight prior to use;

heating said substantially solid hot melt thermoplastic sealant to enable said substantially solid hot melt thermoplastic sealant to flow; and applying a layer of said substantially solid hot melt thermoplastic sealant to an exterior surface of said thermoplastic membrane layer and a plastic portion of the roof member after said roofing membrane has been bonded to the roof to seal the joint between said roofing membrane and the roof member.

18. The method of claim 17, wherein said substantially solid hot melt thermoplastic sealant comprises at least approximately 100 percent solids by weight prior to use.

19. The method of claim 17, wherein said substantially solid hot melt thermoplastic sealant includes an ultraviolet (UV) light stabilizer.

20. The method of claim 17, wherein said plastic phase comprises polypropylene.

* * * * *